(12) United States Patent
Iqbal et al.

(10) Patent No.: US 7,356,912 B2
(45) Date of Patent: Apr. 15, 2008

(54) METHOD FOR VENTILATING A SEAT

(75) Inventors: Syed R. Iqbal, Tecumseh (CA); Corina S. Alionte, Windsor (CA); Goran Bajic, Belle River (CA); Shaun C. Howick, Windsor (CA); Zoran Panic, Windsor (CA); Valerija Drobnjakovic, LaSalle (CA); Marinko Lazanja, Windsor (CA); Simone Köhler, Ostfildern (DE); Peter Nägele, Aichach (DE); Stefan Stoewe, Mering (DE); Boris Zlotin, Southfield, MI (US); Piter Ulan, Southfield, MI (US); Vladimir Gerasimov, Southfield, MI (US); Vladimir Proseanik, Southfield, MI (US)

(73) Assignee: W.E.T. Automotive Systems, Ltd., Windsor, Ontario ( * ) Notice: Subject to any disclaimer, the term of this patent is extended or adjusted under 35 U.S.C. 154(b) by 410 days.

(21) Appl. No.: 10/822,405

(22) Filed: Apr. 12, 2004

(65) Prior Publication Data

US 2005/0066505 A1    Mar. 31, 2005

Related U.S. Application Data

(60) Provisional application No. 60/525,959, filed on Dec. 1, 2003, provisional application No. 60/505,806, filed on Sep. 25, 2003.

(51) Int. Cl.
*H01C 17/02* (2006.01)
(52) U.S. Cl. ............... 29/613; 29/421.1; 29/428; 29/611; 29/890.032; 62/180; 165/43; 236/49.3; 236/91 C; 297/180.1; 297/180.13; 297/180.14

(58) Field of Classification Search ............... 29/613, 29/421.1, 428, 611, 890.032; 165/43; 297/180.1, 297/180.13, 180.14; 454/907; 62/180; 236/49.3, 236/91 C
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |

(Continued)

FOREIGN PATENT DOCUMENTS

| CA | 1266925 | 3/1990 |

(Continued)

OTHER PUBLICATIONS

Copending U.S. Appl. No. 11/043,600, filed Jan. 26, 2005.

(Continued)

*Primary Examiner*—Tim Phan
(74) *Attorney, Agent, or Firm*—Dobrusin & Thennisch PC

(57) ABSTRACT

The present invention is directed towards a method of forming a ventilated seat. More specifically, in one aspect, the present invention is directed towards providing an insert in fluid communications with an air mover and a seating surface, wherein the system optionally includes a thermoelectric device for providing heating or cooling of air flowing through the insert.

32 Claims, 5 Drawing Sheets

U.S. PATENT DOCUMENTS

| | | |
|---|---|---|
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A | 1/1981 | Fairlie |
| 4,259,896 A | 4/1981 | Hayashi et al. |
| 4,268,272 A | 5/1981 | Taura |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,187,943 A * | 2/1993 | Taniguchi et al. ............ 62/180 |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,049,927 A | 4/2000 | Thomas et al. |
| 6,059,018 A | 5/2000 | Yoshinori et al. |
| 6,059,362 A | 5/2000 | Lin |

| | | |
|---|---|---|
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |
| 6,124,577 A | 9/2000 | Fristedt |
| 6,145,925 A | 11/2000 | Eksin et al. |
| 6,147,332 A | 11/2000 | Holmberg et al. |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,196,627 B1 | 3/2001 | Faust et al. |
| 6,223,539 B1 | 5/2001 | Bell |
| 6,224,150 B1 | 5/2001 | Eksin et al. |
| 6,237,675 B1 | 5/2001 | Oehring et al. |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman |
| 6,425,637 B1 | 7/2002 | Peterson |
| 6,434,328 B2 | 8/2002 | Rutherford |
| 6,478,369 B1 | 11/2002 | Aoki et al. |
| 6,481,801 B1 | 11/2002 | Schmale |
| 6,483,087 B2 | 11/2002 | Gardner |
| 6,491,578 B2 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson |
| 6,592,181 B2 | 7/2003 | Stiller et al. |
| 6,598,405 B2 | 7/2003 | Bell |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,682,140 B2 | 1/2004 | Minuth et al. |
| 6,685,553 B2 | 2/2004 | Aoki |
| 6,687,937 B2 | 2/2004 | Harker |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,826,792 B2 | 12/2004 | Lin |
| 6,828,528 B2 | 12/2004 | Stöwe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,929,322 B2 | 8/2005 | Aoki et al. |
| 6,957,545 B2 | 10/2005 | Aoki |
| 6,976,734 B2 | 12/2005 | Stoewe |
| 7,040,710 B2 | 5/2006 | White et al. |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0067058 A1 | 6/2002 | Pfahler |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2004/0036326 A1 | 2/2004 | Bajic |
| 2004/0104607 A1 | 6/2004 | Takeshi et al. |
| 2004/0118555 A1 | 6/2004 | Fristedt |
| 2004/0139758 A1 | 7/2004 | Toshifumi et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0072165 A1 | 4/2005 | Bell |
| 2005/0200179 A1 | 9/2005 | Bevan et al. |
| 2005/0257541 A1 | 11/2005 | Kadle et al. |
| 2005/0264086 A1 | 12/2005 | Lofy et al. |
| 2006/0048518 A1 | 3/2006 | Bell |
| 2006/0103183 A1 | 5/2006 | White et al. |
| 2006/0130490 A1 | 6/2006 | Petrovski |
| 2006/0197363 A1 | 9/2006 | Lofy et al. |
| 2006/0208540 A1 | 9/2006 | Lofy et al. |
| 2006/0214480 A1 | 9/2006 | Terech |

FOREIGN PATENT DOCUMENTS

| | | |
|---|---|---|
| CA | 2393970 | 6/2001 |
| DE | 3513909 | 10/1986 |
| DE | 37 05 756 A1 | 10/1988 |
| DE | 4112631 | 4/1992 |
| DE | 19503291 | 8/1996 |
| DE | 19634370 | 3/1998 |
| DE | 197 36 951 A1 | 3/1999 |
| DE | 19737636 | 3/1999 |
| DE | 19805174 | 6/1999 |
| DE | 19810936 | 9/1999 |
| DE | 199 20 451 A1 | 12/1999 |
| DE | 199 54 978 C1 | 1/2001 |
| DE | 19954978 | 1/2001 |
| DE | 100 01 314 A1 | 7/2001 |
| DE | 100 24 880 C1 | 9/2001 |
| DE | 10013492 | 9/2001 |
| DE | 10030708 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0128534 | 12/1984 |
| EP | 0280213 | 8/1988 |

| | | |
|---|---|---|
| EP | 0 517 615 A1 | 12/1992 |
| EP | 0517615 | 12/1992 |
| EP | 411375 | 5/1994 |
| EP | 0730720 B1 | 11/1994 |
| EP | 0809576 B1 | 2/1996 |
| EP | 0 936 105 A1 | 8/1999 |
| EP | 0936105 | 8/1999 |
| EP | 1050429 | 11/2000 |
| EP | 1 075 984 A2 | 2/2001 |
| EP | 1075984 | 2/2001 |
| EP | 1123834 | 2/2001 |
| EP | 1088696 | 4/2001 |
| EP | 1266794 | 12/2002 |
| EP | 1 075 984 B1 | 5/2003 |
| EP | 1323573 | 7/2003 |
| EP | 1349746 | 8/2005 |
| FR | 1266925 | 9/1960 |
| FR | 2599683 | 6/1986 |
| FR | 2 630 056 | 10/1989 |
| FR | 2694527 | 2/1994 |
| FR | 2845318 | 4/2004 |
| JP | 1171509 | 7/1989 |
| JP | 5-277020 | 10/1993 |
| JP | 5277020 | 10/1993 |
| JP | 8285423 | 11/1996 |
| JP | 10044756 | 2/1998 |
| JP | 2000125990 | 2/2000 |
| JP | 2001071800 | 3/2001 |
| JP | 2002125801 | 2/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| SE | 0102983 | 3/2003 |
| WO | WO 91/12150 | 8/1991 |
| WO | WO 94/09684 | 5/1994 |
| WO | WO 96/05475 | 8/1995 |
| WO | WO 97/09908 | 3/1997 |
| WO | WO 99/00268 | 1/1999 |
| WO | WO9900268 | 1/1999 |
| WO | WO 02/05341 A1 | 1/2002 |
| WO | WO02/06914 | 1/2002 |
| WO | WO 02/06914 A1 | 1/2002 |
| WO | WO 03/015583 A2 | 2/2003 |
| WO | WO 03/051666 | 6/2003 |
| WO | WO 03/077710 | 9/2003 |
| WO | WO 03/101777 | 12/2003 |
| WO | WO 03/106215 | 12/2003 |
| WO | WO 2004/082989 | 3/2004 |
| WO | WO 2004/028857 | 4/2004 |
| WO | WO 2004/078517 | 9/2004 |
| WO | WO 2004/091966 | 10/2004 |
| WO | WO 2004/091967 | 10/2004 |
| WO | WO 2004/096601 | 11/2004 |
| WO | WO 2004/096602 | 11/2004 |
| WO | WO2004/114513 | 12/2004 |
| WO | WO 2005/021320 | 3/2005 |
| WO | WO 2005/035305 | 4/2005 |
| WO | WO 2005/042299 | 5/2005 |
| WO | WO2005/042301 | 5/2005 |
| WO | WO 2005/047506 | 5/2005 |
| WO | WO 2005/068253 | 7/2005 |
| WO | WO 2005/110806 | 11/2005 |

OTHER PUBLICATIONS

Copending U.S. Appl. No. 11/077,440, filed Mar. 10, 2005.
Copending U.S. Appl. No. 11/186,076, filed Jul. 21, 2005.
Copending U.S. Appl. No. 10/966,653, filed Oct. 15, 2004.
Copending U.S. Appl. No. 10/966,652, filed Oct. 15, 2004.
Copending U.S. Appl. No. 11/001,294, filed Dec. 1, 2004.
Copending U.S. Appl. No. 10/822,518, filed Apr. 12, 2004.
Copending U.S. Appl. No. 11/263,642, filed Oct. 31, 2005.
Co-pending U.S. Appl. No. 60/474,835, filed May 30, 2003; Heater for an Automotive Vehicle and Method of Forming Same.
Co-pending U.S. Appl. No. 60/428,002, filed Nov. 12, 2002; Heater for an Automotive Vehicle and Method of Forming Same.
Co-pending U.S. Appl. No. 60/505,806, filed Sep. 25, 2003; Improved Energy Efficient Personal Comfort System and Methods.
Co-pending U.S. Appl. No. 10/715,160, filed Nov. 17, 2003; Heater for an Automotive Vehicle and Method for Forming Same.
Co-pending U.S. Appl. No. 10/434,890, filed May 9, 2003; Automotive Vehicle Seat Insert.
Co-pending U.S. Appl. No. 09/755,506, filed Jan. 5, 2001; Portable Ventilated Seat.
Co-pending U.S. Appl. No. 09/755,637, filed Jan. 5, 2001; Air Distribution System for Ventilated Seat.
Co-pending U.S. Appl. No. 09/755,505, filed Jan. 5, 2001; Ventilated Seat.
PCT Search Report; PCT/US03/19929; mailed Oct. 10, 2003.
Komfortabel bei jeder Temperatur.
Excerpt from website http://www.seatcomfort.com/semashow1.htm, Specializing in Seat Ventilation and Heating Systems, Seat Comfort Systems Unveils 3 New Seat Heater Products.
Excerpt from website http://www.seatcomfort.com/ventilation.htm, Specializing in Seat Ventilation and Heating Systems, Ventilation.
Excerpt from website http://www.i-car.com/html_pages/about_icar/current_events_news/advantage/advantage I-Car Advantage Online.
International Search Report for Application Serial No. PCT/US03/19929 filed, Oct. 10, 2003.
Copending U.S. Appl. No. 09/755,506, filed Jan. 5, 2001.
Copending U.S. Appl. No. 09/755,637, filed Jan. 5, 2001.
Copending U.S. Appl. No. 09/755,505, filed Jan. 5, 2001.
Copending U.S. Appl. No. 10/434,890, filed May 9, 2003.
Copending U.S. Appl. No. 09/619,171, filed Jul. 19, 2000.
Automotive Seat Heating Systems, Bauerhin International, received by Assignee W.E.T. Automotive Systems on or about May 2002.
Seat Heating Systems, Kongsberg Automotive, believed to be from websitehttp://www.kongsberg-automotive.no/.
Automotive Heated Seats—Heated Steering Wheels, IGB Automotive Ltd., received by Assignee W.E.T. Automotive Systems on or about May 2003.
GMT 830 Heating & Ventilation System, IGB Automotive Ltd., received by Assignee W.E.T. Automotive Systems on or about Jun. 2003.
"Specializing in Seat Ventilation and Heating Systems" Seat Comfort Systems; news sema show 1; http://www.seatcomfort.com/semashow1.htm, Jun. 10, 2003.
"Seat Heating Systems" Kongsberg Automotive.
Komfortabel bei jeder Temperatur.
"Specializing in Seat Ventilation and Heating Systems"; Seat Comfort Systems; http://www.seatcomfort.com/ventilation.htm, Jun. 10, 2003.
About I-CAR—Current Events/News: e-newsletters: Advantage Online, Aug. 27, 2001.

* cited by examiner

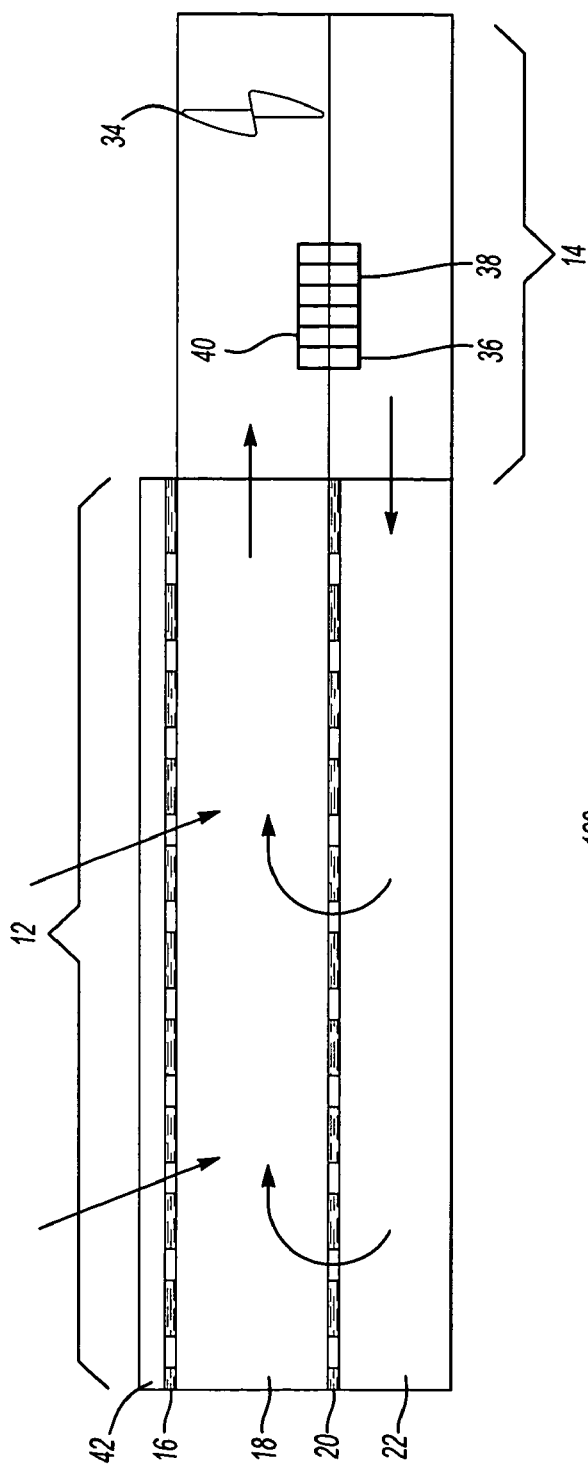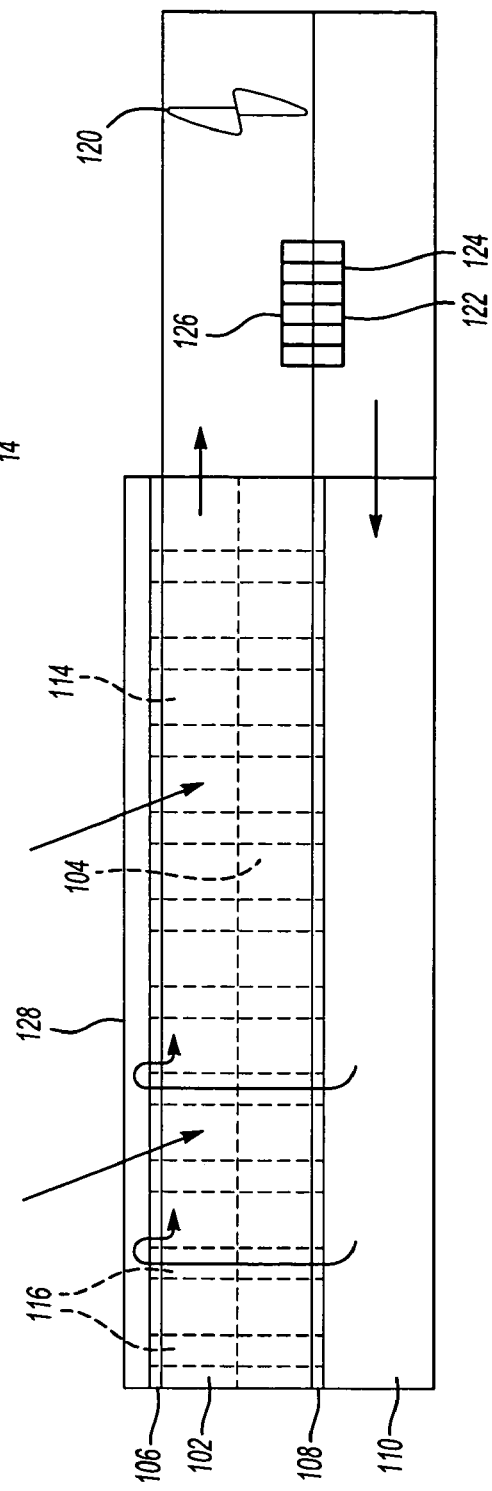

METHOD FOR VENTILATING A SEAT

CLAIM OF PRIORITY

The present application claims the benefit of U.S. provisional applications Ser. No. 60/505,806, filed Sep. 25, 2003 and Ser. No. 60/525,959, filed on Dec. 1, 2003.

FIELD OF THE INVENTION

The present invention relates generally to an insert and system for providing heating, cooling, ventilation or a combination thereof to a seat and more particularly to an insert and system for an automotive vehicle.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference. In addition, other innovations in providing seating comfort are discussed in U.S. patent application Ser. No. 09/619,171, filed Jul. 19, 2000, titled "Ventilated Seat Having a Pad Assembly and a Distribution Device"; U.S. Publication No. 2002/0096931, filed Jan. 5, 2001, titled "Ventilated Seat"; U.S. Pat. No. 6,629,724, issued Oct. 7, 2003, titled "Portable Ventilated Seat"; U.S. patent application Ser. No. 10/434,890, filed May 9, 2003, titled "Automotive Vehicle Seat Insert"; U.S. patent application Ser. No. 10/463,052, filed Jun. 17, 2003, titled "Automotive Vehicle Seating Comfort System"; and U.S. patent application Ser. No. 10/681,555, filed Oct. 8, 2003, titled "Automotive Vehicle Seating Comfort System", each of which are expressly incorporated herein by reference for all purposes.

In the interest of continuing such innovation, the present invention provides an improved insert and system for a seat, which are preferably suitable for employment within or as part of an automotive vehicle seat and which assist in providing comfort control to an occupant in the seat.

SUMMARY OF THE INVENTION

The present invention relates to a ventilated seat having an insert with a seat portion, and having a flow control layer with first and second ports, a spacer having an inlay and a main portion, and a first fluid barrier where the inlay is substantially isolated from the main portion by a fluid-tight boundary. The present invention also relates to a ventilated seat having an insert with a seat portion and having a first flow control layer with at least one port, a first and a second spacer, and a fluid barrier comprising at least one port. The present invention also relates to a ventilated seat with an insert having a seat portion and having a flow control layer with a port and a plurality of flow holes in the seat portion, a spacer, a fluid barrier and at least one conduit with a plurality of flow holes located adjacent to the seat portion of the flow control layer. The seat also may include a fan in fluid communication with the spacer and a fluid conditioning device.

The present invention also relates to methods of ventilating a seat. The method includes providing a thermoelectric device (TED) and conditioning air with the TED to provide heating or cooling and communicating that conditioned air through an insert with either pushing or pulling the condition air through the insert.

BRIEF DESCRIPTION OF THE DRAWINGS

In the drawings:

FIG. 2 shows a schematic view of a system including the first embodiment of the insert.

FIG. 4 shows a schematic view of a system including the second embodiment of the insert.

DETAILED DESCRIPTION

Figure 1:
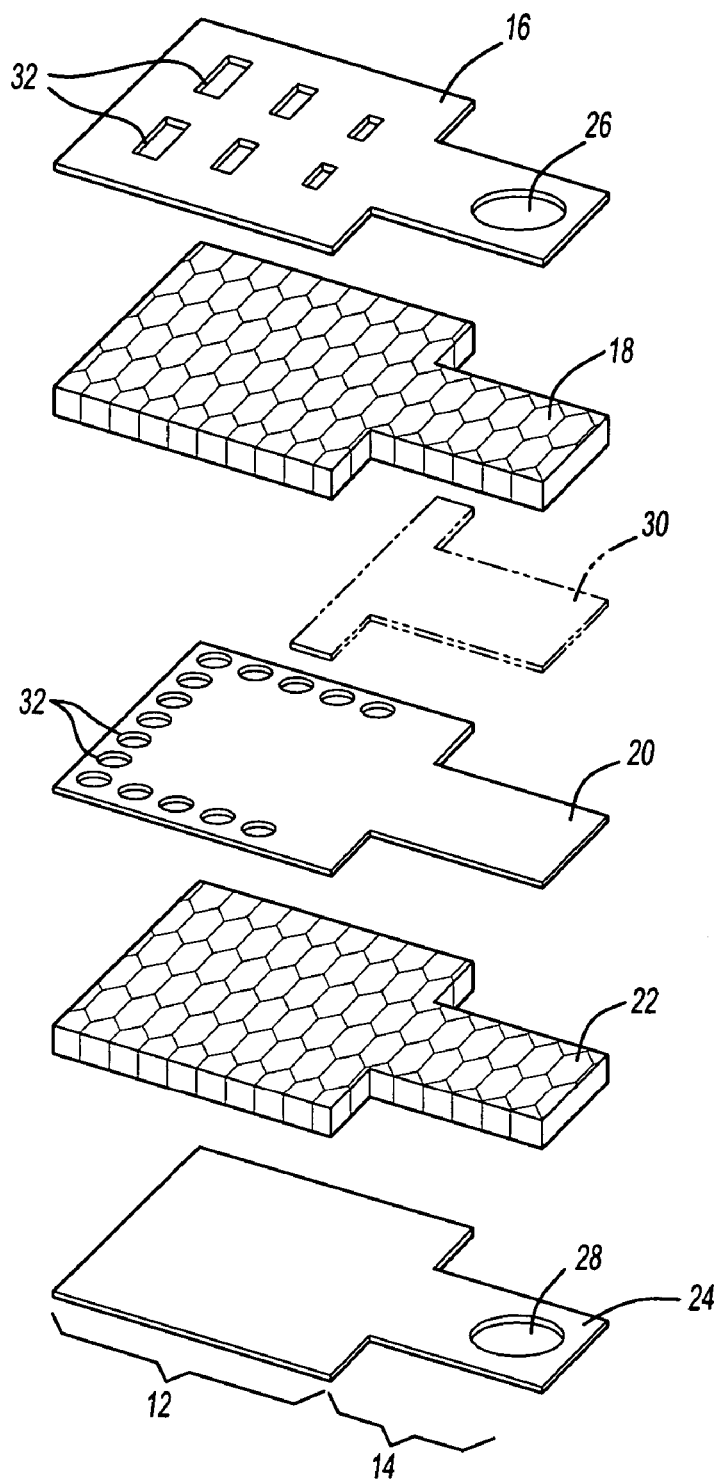
FIG. 1 shows an exploded view of a first embodiment of the insert.

The present invention includes an insert suitable for placement within or on a seat to provide heating, cooling, ventilation or a combination thereof to a seat occupant. The insert will include at least one layer, but preferably includes multiple (e.g. three) layers and each of the layers may be a monolayer or a plurality of layers (e.g. a laminate). The plurality of layers need not be attached to each other but preferably are. More preferably, the layers are attached to each other at least at their edges to form an edge-sealed bag. The layers of the insert are typically co-extensive, although partial layers that are not co-extensive with the other layers or the insert may be suitable in certain instances.

The insert and the layers that make up the insert typically have a seat portion and an extension. As the name suggests, the seat portion generally is the area of the insert that will provide heating, cooling, ventilation or combinations thereof to the area of the seat where the seat occupant resides. The extension permits components of a system including the insert to be remote from the seat portion. This allows the components to be conveniently located so that they do not interfere with the comfort of the seat. While typically the extension is located at the back of the seat, it may be located on either side, in the front of the seat or absent altogether. Multiple extensions may also be used on an insert.

Typically, the insert is supported by a seat cushion or backrest cushion. The seat cushion or backrest cushion may include one or more ducts that extend partially or completely through the cushion, or the cushions may be free of ducts that extend through the cushion. A preferred cushion is a molded plastic foam, which is preferably free of a molded or cut-out fluid distribution ducting network, but may be adapted with a trench or opening for passing the extension from one side of the cushion to the another side. The seat cushion and/or backrest cushion may in turn be supported by a seat frame. Multiple inserts may be used on a single seat or backrest cushion, where inserts may accomplish the same or different functions (e.g. one insert may only cool, while another insert may both heat and cool).

One or more different kinds of layers may be used to make up the insert. For example, the insert may include one or more spacers to provide an open space within the insert. One or more flow control layers may be included to provide selective flow of fluid between one or more layers of the insert, between the insert and the rest of the seat, or between the insert and the ambient. One or more fluid barriers may be included. Other optional layers include layers that include heaters, coolers, one or more additional spacers, one or more covering layers, and/or one or more layers that assist in the manufacture of the insert.

The spacer may be any structure, material or combination of materials and/or structures that permits fluid flow through the material while also providing a measure of support for a seat occupant. The spacers should not collapse under the weight of a seat occupant and maintain the fluid communication through the spacer. As one example, the spacer may include rubber, foam plastic or the like. In one aspect, the spacer may include a reticulated foam or springs.

The spacer may include a plurality of members or fibers that are preferably spaced apart from each other to provide open space therebetween while still being close enough together to provide cushion and support. One preferred spacer is formed of polymeric (e.g., polyester) strand material that is interwoven to provide opposing honeycomb structures (e.g., fabric panels), which are interconnected by several additional polymeric strand materials to provide open space between the structures while still providing cushion and support. As an example, one preferred material is sold under the tradename 3MESH® and is commercially available from Müller Textil GmbH, Germany or Müller Textiles, Inc., R.I., USA.

Another preferred spacer is formed of a polymeric material in a helix held between two sheets of material. Preferably, the helix is oblong in order to provide increased area on the helix for attachment of the helix to the sheets of material. The helix may be tightly wound such that adjacent courses of the helix touch or loosely wound such that there is no touching of adjacent courses of the helix. Typically, multiple helices are placed adjacent (abutting or otherwise) to one another in order to form a spacer. Exemplary helical material is discussed in international applications PCT/DE04/000540 and PCT/DE04/000541, both files Mar. 17, 2004, both of which are incorporated by references.

Another preferred spacer material is a grooved material. The grooved material includes a plurality of hills and valleys, where the hills have through holes. The grooved material may include any suitable material such as a molded or shaped foam or plastic. The flow holes may be made before, at the same time, or after the hills and valleys.

Combinations of the above described materials may be used to afford a spacer.

The flow control layer is typically formed of a plastic or polymeric material that softens or melts upon exposure to heat to assist its adherence to one or more other layers of the insert. Alternatively, the flow control layer may be formed of fabrics, woven materials (e.g., Goretex® or microfibers), nylon, closed pore foam or other the like. Preferably, the flow control layer is at least partially impermeable to fluids and particularly to air, except at a plurality of through holes. The layer need not be substantially impermeable to any fluid or air. Exemplary through holes include ports (e.g. inlets and/or outlets), typically located in the extension, and flow holes, typically located in the seat portion.

Dimensionally, for a flow control layer, it is preferable for the film thickness to be about 0.1 mm to about 2.0 mm thick and more preferably about 0.7 mm to about 1.0 mm thick.

Of course, it is contemplated that the flow control layer may have a variable thickness and may be outside of the aforementioned ranges.

The fluid barrier may be similar to the flow control layer and may include the same or different materials as the flow control layer. Preferably, the fluid barrier has similar composition and dimensions as the flow control layer. Like the flow control layer, the fluid barrier may include one or more ports, typically on the extension of the insert. Unlike the flow control layer, the fluid barrier does not comprise flow holes. Also like the flow control layer, the fluid barrier is at least partially impermeable to fluids and particularly to air, except at the ports. The fluid barrier need not be substantially impermeable to any fluid or air.

The ports and flow holes generally provide fluid communication across the fluid barriers and the flow control layers. The flow holes are generally located on the seat portion of the insert. The pattern of the flow holes on each flow control layer may be the same or different. In one preferred layout, the size of the flow holes varies in a gradient across the seat portion of the insert. Typically, the flow holes will be larger near the front of the seat as compared to the back of the seat; however, this is not necessarily the case. By creating a gradient of size in this way, fluid flow through the flow control layer at various locations may be selected. In another preferred layout, the flow holes roughly correspond to the area of the seat where an occupant would make contact with the seat.

Exemplary optional layers include those having a heater. Various different types of heaters are suitable for incorporation into a car seat and it is contemplated that any of such heaters may be incorporated into the inserts of the present invention. Such heaters typically incorporate flexible, electrical heating elements that are preferably thin, flat, non-obtrusive or a combination thereof. As examples, a lay-wire heater, a carbon fiber heater, a positive thermal coefficient (PTC) heater, a thermoelectric heater or the like, which are typically supported with a backing (e.g., a cloth or fabric type backing) may be used within the insert. In a preferred embodiment, the heater is a carbon fiber type heater with a backing (e.g., a non-woven layer). One exemplary preferred heater is sold under the tradename CARBOTEX® and commercially available from W.E.T. Automotive Systems, Inc. in Germany and/or FTG Fraser-Technik GmbH. An example of such a heater is disclosed in U.S. Pat. No. 6,064,037, issued May 16, 2000, herein expressly incorporated by reference for all purposes. A combination heater/cooler in the form of a flexible sheet of TEDs may be a suitable optional layer. Flexible sheet TEDs include those discussed in U.S. Pat. No. 6,700,052, which is incorporated by reference. Other coolers may includes those described in U.S. provisional application 60/505,806, filed Sep. 25, 2003, which is incorporated by reference.

The optional additional spacer may be the same or different material as used for spacers in other parts of the insert. A preferred optional additional spacer includes a reticulated foam.

Suitable optional covering layers include seat covers that are part of the insert or separate from the insert, but generally separate the insert from the seat occupant. The seat cover may be any suitable material, including but not limited to at least one synthetic material, natural material (e.g., wool, leather or otherwise), or combination thereof. In one embodiment the seat cover includes perforations over at least a portion of the seating surface through which air or other fluid may pass. In another embodiment the cover is substantially free of perforations. For example, perforated or non-perforated leather may be used to separate the seat occupant from the insert, while a fleece material may be used as part of the insert to increase moisture wicking or otherwise provide a protective layer.

The additional spacer and the seat cover may have an area that is co-extensive with the insert or they may have areas that are greater or lesser than that of the insert.

One or more adhesive layers may be used to assist in the assembly of the inserts. The adhesive layers are preferably formed of a hot melt adhesive although this is not necessarily required. The adhesive may be provided as a web or otherwise and may be continuous or non continuous (e.g., may be applied in drops, dabs or the like). The adhesive sub-layers may include polyamides, polyesters, elastomers, urethanes, olefin polymers or a combination thereof. Moreover, the adhesives may be formulated as desired for particular processing parameters or conditions. Preferably, the adhesive sub-layers are substantially free of anti-blocking solutions, blowing additives, process contaminants or the like which might interfere with adhesive performance. As an example, one suitable hot melt adhesive is commercially available as a non-woven web under the tradename SPUN-FAB® from Spunfab, Ltd. 175 Muffin Lane, Cuyahoga Falls, Ohio 44223.

The insert of the present invention may be a separate unit that is assembled in a space between a seat cushion and the seat cover, integrally formed in the seat cushion, integrally formed in the seat cover, or any combination thereof.

In addition to the insert, the present invention includes a system that provides heating, cooling, ventilation or combinations thereof. The system has an insert and one or more different components that facilitate the operation of the insert. For example, the system may include a fan, a fluid conditioning device, one or more attachment components, one or more valves, one or more sensors and/or one or more controls. In addition, one or more conduits may be used to provide fluid communication between components of the system such as between the fan and the insert or between the insert and the fluid conditioning device.

The fan provides motive force to move air (whether conditioned, ambient, pushed, pulled and combinations thereof) through the insert. The fan may be used to push air to the insert or pull air from the insert. The fan may also be used to both push and pull air. For example, at least two sets of fan blades (e.g. with vanes that are opposite in direction) that share a common axis and form a binary fan that is able to both push and pull air. Multiple fans may also be used. The fan may also include an annular inlet, although fan that are free of annular inlets are also contemplated. Included in the definition of fan are impellers (including bidirectional impellers), blowers, or the like. The fan also refers to devices that provide motive force to move other fluids (e.g. liquids) through the insert. The fan may provide a steady fluid flow, a pulsating fluid flow, an oscillating fluid flow, or the like.

The fluid conditioning device may be any device that heats or cools fluid. The device may be a combination of devices where one component provides heating and another component provides cooling. Preferably, one device or system provides both heating and cooling. The device may be an external device such as the HVAC system in the building or vehicle where the seat is located or an internal device meaning that the device is not connected (other than to a power supply) to the building or vehicle where the seat is located. In addition to providing temperature conditioning the fluid conditioning device may also dehumidify the fluid (e.g. air).

Preferably, the fluid conditioning device is a self contained or solid state device that both cools and heats air. The most preferred device is a peltier or thermoelectric device (TED). TEDs are commercially available devices that provide solid state heating and cooling by passing electricity through the device. TEDs include a waste side and an active side, which are relative designations depending whether warm or cool temperature conditioned air is desired. Any supplier of TEDs would be able to provide suitable devices for use in the present invention, with TEDs from Tellurex (Telluride, CO) being preferred. The TED may be combined with any useful heat dissipation device; e.g. heat sinks, heat exchangers, fans, heat pipes or the like.

The attachment component is a frame member that preferably defines a location for the attachment of the fan, fluid conditioning device, a conduit or other component to the insert. It is contemplated that the frame member may be in a variety of configurations (e.g., annular, rectangular, square, polygonal or otherwise) and may be formed of a variety of preferably rigid or semi-rigid materials (e.g. metal, plastic or the like). In some aspects, the attachment component also helps define a port. In one preferred embodiment, the attachment component cooperates with structures and/or materials (e.g. snap fit fasteners) on the fan, the fluid conditioning device or other components to connect the device or component to the attachment component.

One or more valves may be used to redirect fluid flow through the system to make use of unused energy (i.e. the fluid is hotter than ambient) or energy capacity (i.e. the fluid is colder than ambient) in the fluid. For example, the valves may be used to vent fluid to ambient to dispose of un-needed energy stored in the fluid. The valves may also be used to redirect fluid to components of the system (e.g. the fluid conditioning device) to either warm or cool such components. In addition, a valve may be used to optionally recirculate fluid within system to create a closed or partially closed system.

A variety of sensors may be included in the system such as temperature sensors, humidity sensors, current sensors, occupant detection sensor, weight sensors or the like. Sensors may be placed throughout the system. For example, temperature sensors may be place within the spacer, between spacers, between the spacer and any additionally optional layer (e.g. reticulated foam or seat cover), near the fluid conditioning device, near the fan, and combinations thereof.

One or more controllers may be used to receive inputs from the sensors or a used control device, to issue instructions to the fan and fluid conditioning device, and/or to otherwise coordinate the operation of the system.

The embodiments of the inserts and systems discussed below utilize air as the temperature conditioned fluid communicated through the insert and/or system. It should be understood, however, that other gas and/or liquid fluid may also be utilized in these embodiments.

As seen in FIG. 1, the first embodiment of the insert 10 generally includes a seat portion 12 and an extension 14. The insert also includes a first flow control layer 16, a first spacer 18, a second flow control layer 20, a second spacer 22 and a first fluid barrier 24. Here, the spacers comprise a polymeric strand material. In a preferred embodiment, these layers are sealed together at least at their edges to form an edge sealed bag.

Both the first flow control layer 16 and the first fluid barrier 24 include at least one port 26 and 28, respectively. The ports are generally located on the extension of the insert and provide access to the spacers. Instead of in the first fluid barrier, the port 28 may be located laterally to the second spacer layer. In this aspect, the port is defined by the extensions of the second flow control layer and the first fluid barrier. In another aspect, the port may be located in the second flow control layer 20. Here, a partial fluid barrier 30 (shown in phantom) would be needed to separate the neck of the second flow control layer 20 from the neck of the first spacer 18.

The flow control layers include a plurality of flow holes 32. The flow holes are generally located on the seat portion of the insert. The pattern of the flow holes on each flow control layer may be the same or different.

In another aspect, the first flow control layer may be replaced with a second fluid barrier with a port on the extension. This provides an insert that would not blow or draw air to or from the seat occupant. In yet another aspect, the first flow control layer may be replaced with a combination of reticulated foam on the seat portion and a fluid barrier on the extension. The fluid barrier would include a port.

In a system including the insert of the first embodiment, the fan is attached to the insert at one of the ports. Alternatively, a conduit connects a fan to the insert at either of the two ports. Such attachment may be facilitated by an attachment component. The fan may be configured to either pull air out of the insert or push air into the insert.

The system including the first embodiment of the insert also preferably includes an fluid conditioning device in the form of a TED. The TED may be located remote from the insert and the fan, but this is not necessarily so. Indeed, the TED may preferably be placed adjacent to the insert or attached to the insert with an attachment component. The TED is preferably positioned such that air flow across both the waste and active sides of the TED is possible through the use of a single fan. In addition, the TED may be placed relative to the fan such that conditioned air from the active side of the TED is either pushed to the spacers or pulled from the spacers. Conduits may be used to achieve the desired air flow.

In a preferred embodiment, as shown schematically in FIG. 2, the insert 10 includes two flow control layers 16 and 20 and the fan 34 pulls air across the active side 36 of a TED 38 and through the spacers 18, 22, while also pulling air across the waste side 40 of the TED. This aspect is shown with an optional additional spacer 42. The air flow is indicated schematically by the arrows in FIG. 2. In the alternative, the fan may push air across the waste side. In one preferred embodiment, the active side of the TED is cooling the air being drawn across it by the fan, while the waste side of the TED is having heat evacuated from it by the fan. The temperature conditioned air is routed through the spacers to provide the seat occupant with a cooling sensation.

In one aspect, the second flow control layer permits ambient air (i.e. air not conditioned by the fluid conditioning device) from near the seat occupant to be drawn by fan to provide additional ventilation and cooling. Such a configuration is shown in FIG. 2, where the arrows indicate that air is drawn through the top of the insert. In another aspect, a second fluid barrier is used in place of the first flow control layer, which prevents ambient from being drawn from near the seat occupant.

Figure 3:
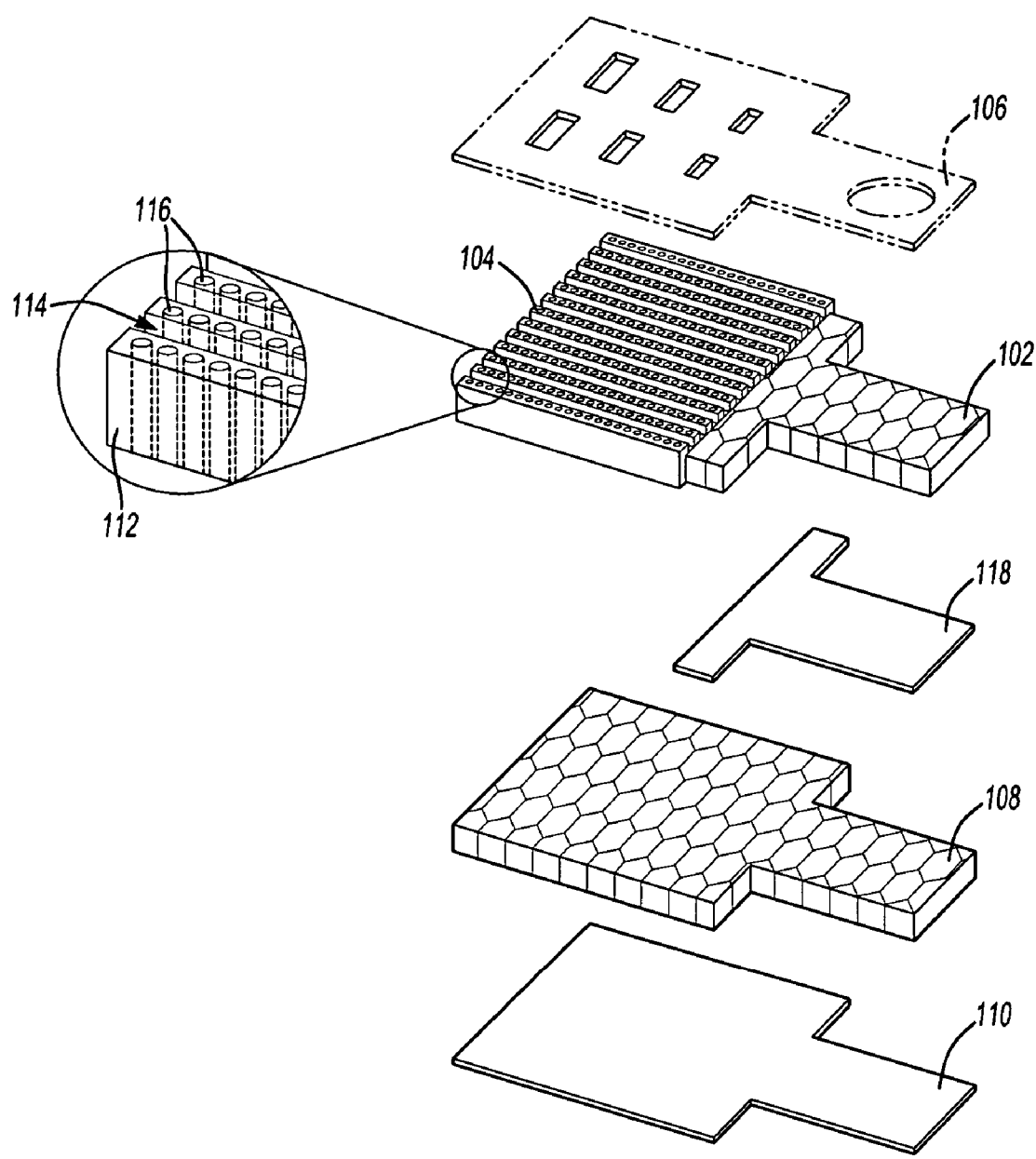
FIG. 3 shows an exploded view of a second embodiment of the insert.

As seen in FIG. 3, the second embodiment of the insert 100 is similar to the first embodiment with the first spacer 102 including a grooved material 104. The use of the grooved material makes the use of the first flow control layer 106 (shown in phantom) optional. The insert also includes a second spacer 108 and a fluid barrier 110. The grooved material 104 includes a plurality of hills 112 and valleys 114, the hills include a plurality of flow holes 116. In the aspect shown in FIG. 3, the grooved material makes up only a portion of the first spacer and another spacer material (e.g. polymeric strand material) makes up the remainder of the first spacer. Alternatively, the first spacer may be completely made up of the grooved material. While generally parallel hills and valleys are preferred, other arrangement of hills and valleys may also be suitable. Typically, when the first spacer is entirely grooved material, the valleys will extend from the seat portion to the port area in the extension. In this aspect, the flow holes may only be located on hills in the seat portion of the insert. In this embodiment, a partial fluid barrier 118 may be needed between the extensions of the spacers to facilitate air flow through the seat portions of the spacers.

Like the system including the first embodiment of the insert, the system including the insert of the second embodiment makes similar use of a fan and TED. As described above, the fan and TED may be combined in a variety of ways in the system.

In a preferred embodiment of the system, as shown schematically in FIG. 4, a fan 120 is positioned to draw air across the active side 122 of a TED 124 through the second spacer 108, through the flow holes 116, down the valleys 114 toward the fan and across the waste side 126 of the TED, as shown by the arrows. Here, a fluid barrier may be used to prevent the fan from drawing ambient air from near the seat occupant. This aspect is shown with an optional additional spacer 128.

Figure 5:
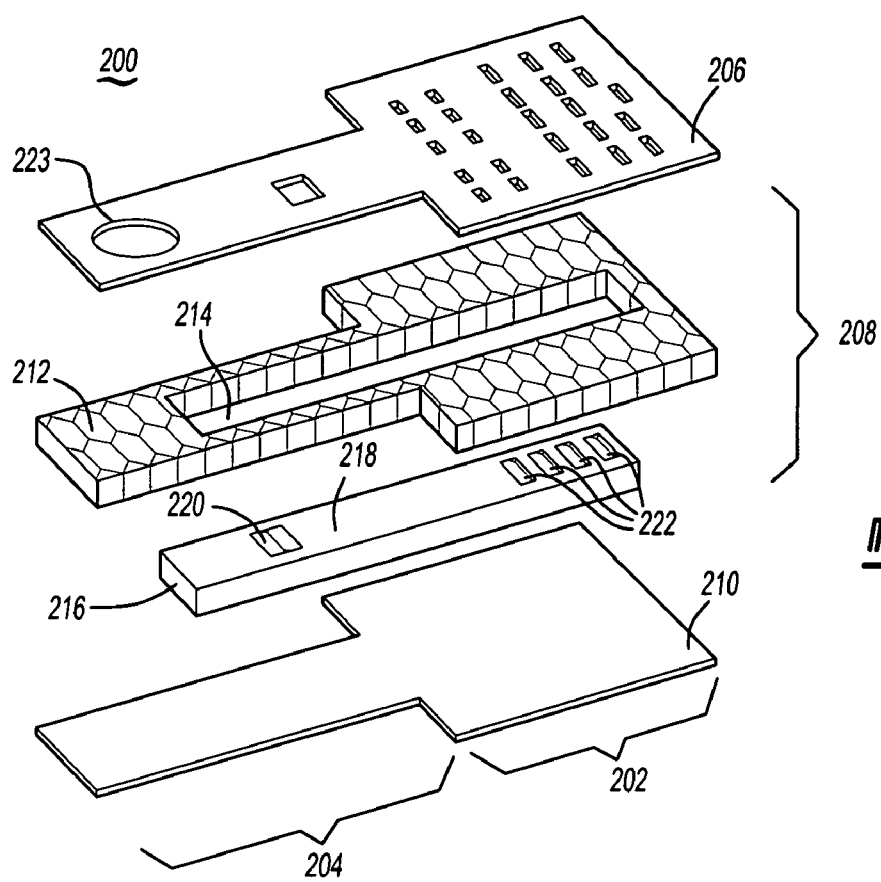
FIG. 5 shows an exploded view of a third embodiment of the insert.

As seen in FIG. 5, in a third embodiment of the insert 200 generally includes a seat portion 202 and an extension 204. The insert also includes a flow control layer 206, a spacer 208, and a fluid barrier 210. A second fluid barrier may be substituted for the flow control layer 206.

The spacer 208 includes a main portion 212 with a cutout 214 therein. An inlay 216 is adapted to be received within the cutout 214. In an alternate embodiment, the relative positions of the main portion and the inlay are reversed such that the inlay at least partially surrounds the main portion. This embodiment is similar to the fourth embodiment (discussed below) where the conduit comprises a spacer material The main portion and the inlay may be the same or different materials from each other and their materials are typically selected from the spacer materials discussed above.

When the inlay 216 is assembled with the main portion 212 (i.e. inlaid in the main portion) there is a fluid barrier 218 that at least partially creates a fluid-tight boundary that prevents fluid communication between the main portion 212 and the inlay 216 of the spacer.

Typically, when assembled, the inlay resides both in the extension and the seat portion of the insert. While shown in FIG. 5 as being un-branched, the inlay may take on a variety of branched shapes, such a Y-shape where the arms of the Y reside in the seat portion while the tail resides in the extension of the insert. A "branches-on-branches" configuration may also be suitable. Generally, only one inlay is preferred, but multiple inlays may be suitable.

The fluid barrier may located on or about the inlay, in the main portion or be a separate component from both the main portion and the inlay. In one preferred aspect, the fluid barrier is included in the inlay.

The inlay includes a port 220 in the fluid barrier that provides fluid communication to the interior of the inlay. The port is typically located in area of the inlay that resided on the neck of the insert. The inlay also preferably includes a plurality of flow holes 222 in area of the inlay that resides in the seat portion of the insert. These flow holes may be aligned parallel to the plane of the insert, normal to the plane of the insert, or at some other angle. The flow control sheet includes a port 223 aligned with the main portion and that provides fluid communication to the interior of the main portion.

In one aspect, the inlay may comprise a strand material, a grooved material or a reticulated foam material. With the grooved material it may not be necessary to utilize the fluid barrier on or around the inlay.

Like the systems including the first and second embodiments of the insert, the system including the insert of the third embodiment makes similar use of a fan and TED. As described above, the fan and TED may be combined in a variety of ways in the system.

Figure 6:
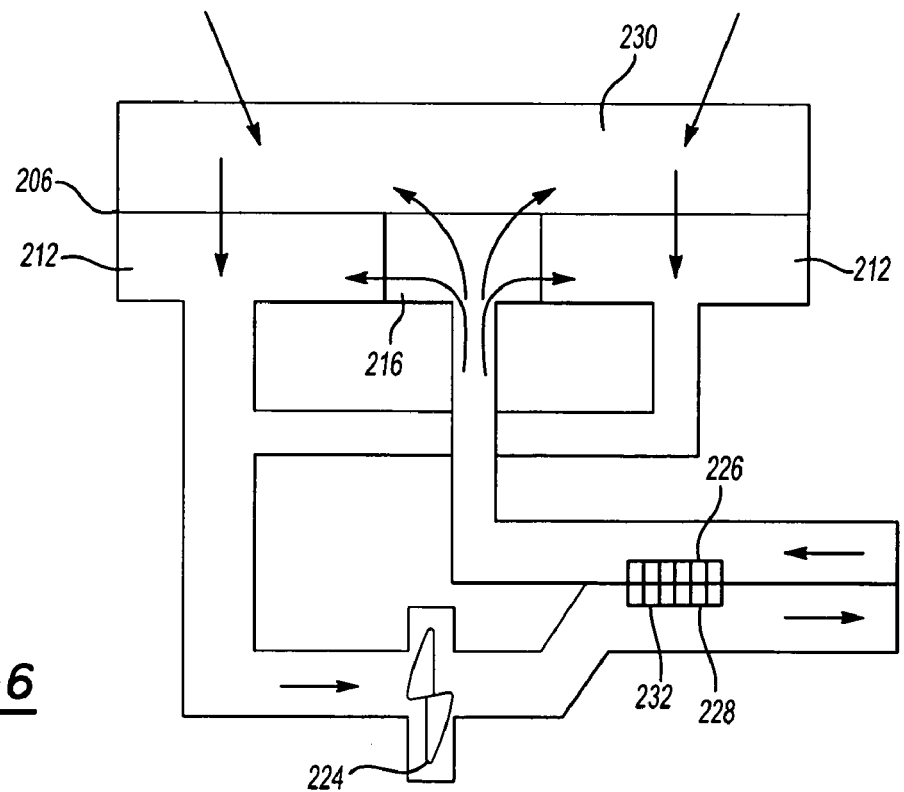
FIG. 6 shows a schematic view of a system including the third embodiment of the insert.

In a preferred embodiment of the system, as shown schematically in FIG. 6, the insert 200 includes a fan 224 that pulls air across the active side 226 of a TED 228 and through the inlay 216 to the main portion 212 or to an optional additional spacer 230 via flow holes. The fan also pushes air across the waste side 232 of the TED. In the alternative, the fan may pull air across the waste side. In one preferred embodiment, the active side of the TED is cooling the air being drawn across it by the fan, while the waste side of the TED is having heat evacuated from it by the fan. The temperature conditioned air is routed through the inlay and main portions of the spacer to provide the seat occupant with a cooling sensation.

Figure 7:
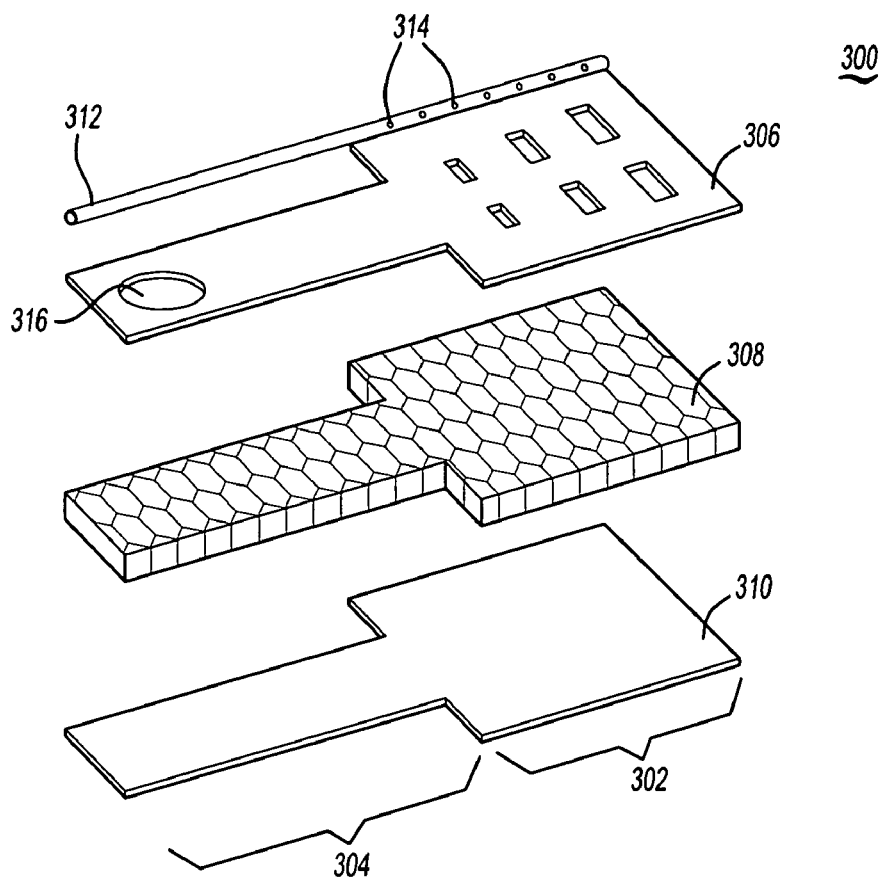
FIG. 7 shows an exploded view of a fourth embodiment of the insert.

As seen in FIG. 7, in a fourth embodiment of the insert 300 generally includes a seat portion 302 and an extension 304. The insert also includes a flow control layer 306, a spacer 308, a fluid barrier 310 and at least one conduit 312. Preferably, a plurality of conduits is used. In one embodiment, a second fluid barrier may be substituted for the flow control layer 306.

The conduit provides fluid communication to or from the seat portion of the insert. Preferably, the conduit is generally located along the edge of the seat portion or the extensions of the insert. In the alternative, the conduit may extend into the seat portion of the insert.

The conduit comprises one or more flow holes 314 located on the seat portion of the conduit. The flow holes may have one or more directions, i.e. generally normal to the place of the insert, generally in the same plane as the plane of the insert, or any angle in between. The conduit may be held within the insert (whether the insert is a sealed bag insert or not), attached to the exterior of the insert or formed as part of the insert. In a preferred embodiment, the conduit is located underneath the flow control layer and in the plane of the insert. As seen in the FIG. 8, the conduit may be located above the flow control layer.

The conduit is preferably made of a flexible tubing material that is distinct from the material of the spacer, although this is not necessarily the case. Suitable flexible tubing material includes tubing with wall thicknesses ranges from about 1/64 in to about 1 in or more. The material of suitable tubing may be selected to provide low thermal capacity, meaning that tubing does not insulate well. The conduit may also comprise spacer material that is sectioned from the insert by a fluid-tight barrier. While generally part of the insert, the conduit may be used to replace other components of a seat (e.g. as a front or side bolster) or may be used augment other components of a seat (e.g. the additional spacer layer).

Like the systems including the other embodiments of the insert, the system including the insert of the fourth embodiment makes similar use of a fan and TED. As described above, the fan and TED may be combined in a variety of ways in the system. A port 316 for the fan is generally located on the extension of the insert, while the TED is preferably co-located with the extension of the insert; more preferably it is attached to the extension.

Figure 8:
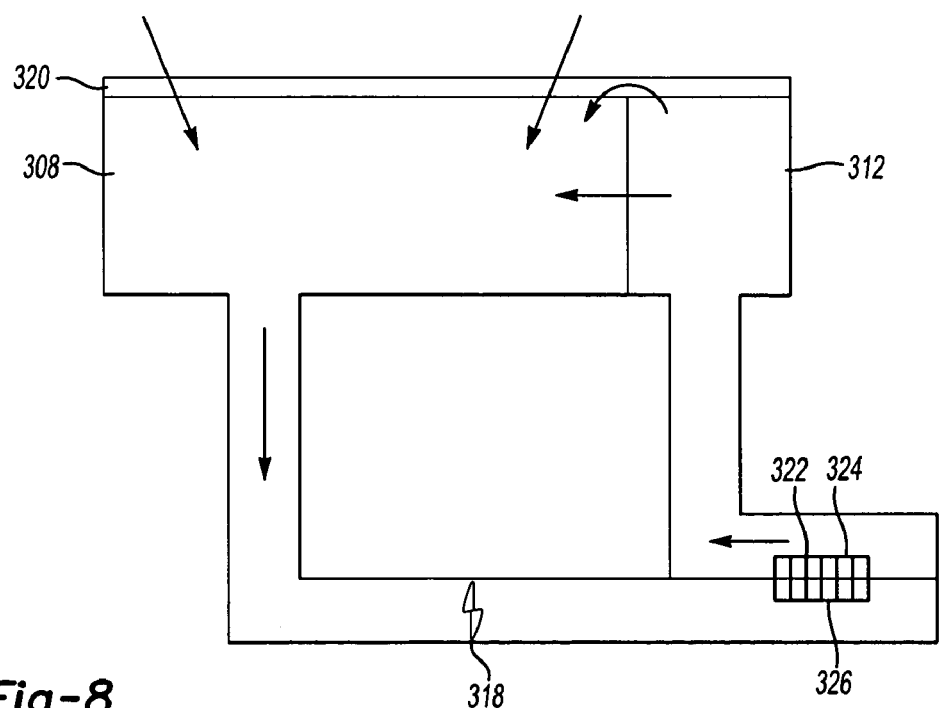
FIG. 8 shows a schematic view of a system including the fourth embodiment of the insert.

In a preferred embodiment of the system, as shown schematically in FIG. 8, the insert 300 includes a fan 318 that pulls air through the spacer 308 and/or through the additional spacer 320 from the flow holes of the conduit 312. The fan pulls the air across the active side 322 of a TED 324 through a manifold to the flow holes of the conduit. The fan also pushes air across the waste side 326 of the TED. In the alternative, a second fan is used to push air across the active side of the TED through the manifold to the flow holes of the conduit.

In one preferred embodiment, the active side of the TED is cooling the air being drawn across it by the fan, while the waste side of the TED is having heat evacuated from it by the fan. The temperature conditioned air is routed through the spacer to provide the seat occupant with a cooling sensation.

Depending on the location of the conduit and the flow holes, the temperature conditioned air may flow directly to or from the conduit to the spacer. Alternately, the air may flow through another material between the conduit and the spacer. In this way, the temperature conditioned air is pulled (and/or pushed) across the surface of the insert. For example, the air may flow through or over any of the optional layers discussed above such as an additional spacer (e.g. reticulated foam) or a covering (e.g. perforated leather).

In a preferred embodiment, the temperature conditioned air flows into the additional spacer and ambient air flows through the seat cover into the additional spacer, where the air mixes. The mixed air flows into the spacer material of the insert because of the pulling of the fan. In another preferred embodiment, the mixed air does not flow. This may be achieved by through selection of the size and power of the fan(s) used in the system. In a one fan system, the fan should produce a negative pressure in the additional spacer. In a two or more fan system, any fans that push air through the manifold to the flow holes of the conduit should produce a positive pressure that is less than the negative pressure produced by the fan that pulls air through the insert.

In one optional embodiment, a valve (not shown) is utilized to redirect temperature conditioned air before it flows through the spacer. Such redirected air may be vented to ambient because the insert has reached the desired temperature. Such redirected air may also be shunted to the waste side of the TED to help dissipate waste energy.

In another optional embodiment, a valve is utilized to recirculate temperature conditioned air after it has flowed through the spacer. Such recirculated air may have a temperature that is closer to the desired temperature than that of ambient air. For example, when the TED is in the cooling mode, the recirculated air may be cooler than ambient air. Thus, it would be more efficient to cool the recirculated air to the desired temperature than it would be to cool the ambient air.

In another embodiment, the present invention comprises a ventilated seat a perforated seating surface that supports a seat occupant and a mixing region that is located under the seating surface where ambient air is combined with a cooled fluid. A fan may be use to bring ambient air into the mixing region. The fan may also function to bring the cooled fluid to the mixing region or to remove the mixed ambient air and cooled fluid from the mixing region. As discussed above, a fluid conditioning device may be used to modify (e.g. reduce) the temperature of the fluid.

In one embodiment, it is contemplated that the control system is employed to automatically change the power provided to the TED when a certain temperature has been reached or after a certain period of time. Less preferably, though also possible, the system automatically changes the power based upon a combination of both a sensed temperature and a certain period of time. In this regard, one system of the present invention preferably automatically regulates only one of the amount of power directed to the TED or the operating speed of the fan or the like to achieve the desired cooling temperature. However, one embodiment also contemplates the automatic regulation of both the amount of power directed to the TED and the operating speed of the fan. It is preferred that the operation of the system of the present invention is done independent of any signal from an occupant detection senso, if any. However, it is possible that an occupant detection sensor is employed in communication with a control system for automatically operating the system upon detection of the presence of a user.

The present invention also relates to the methods of providing heating, cooling, ventilation or combination thereof. One method includes pulling air across an active side of a TED, through one or more spacers and across a waste side of the TED. Another method includes pulling air across an active side of a TED, through an inlay, through a main portion of a spacer, and across a waste side of the TED. Yet another method includes pulling air across an active side of a TED, through a conduit, through a spacer and across a waste side of the TED. In all of these methods, the air may be pushed across the waste side of the TED. Furthermore, instead of generally pulling the air, pushing the air may be utilized. It will be recognized that the in the above methods other fluid conditioning devices besides TEDs may be used and that fluids other than air may be moved by the fan.

In another embodiment, the method comprises drawing ambient air through a seating surface of a transportation vehicle seat into a mixing region of the seat. In the mixing area, the ambient air is mixed with air cooled by a thermoelectric device and provided to the mixing region. In one embodiment, the pressure in the mixing region below the ambient pressure so that substantially all of the resulting mixture does not pass through the seating surface. In another embodiment, cooled air is blown into the mixing region while substantially all the resulting mixture is kept from passing through the seating surface. In either embodiment, the resulting mixture is removed from the mixing region. In one embodiment, the mixing region is located within an insert. In another embodiment, the mixing region is disposed between an insert and a seating surface.

In a preferred embodiment, the present invention provides cooling from above about 100° C. and more preferably provides cooling from about 80° C. Also, the present invention provides cooling to below about 37° C., and more preferably to below about 27° C., and most preferably below about 25° C. These temperatures may refer to air temperature within the insert, anywhere within the system or the temperature at or near the seat surface. In one preferred embodiment, the present invention provides cooling at a rate of greater than about 5° C./min, greater than about 10° C./min, greater than about 15° C./min and greater than about 20° C./min, greater than about 25° C./min and greater than about 35° C./min.

Preferably, the insert and the system may be included in a seat used in a transportation vehicle (e.g. an automotive vehicle seat); however, the insert and system may be used in a variety of other seats such as desk chairs, lounge chairs, or the like.

Generally, for forming an insert according to the present invention, it is contemplated that the various layers of the insert as described above may be combined in a variety of sequences and according to a variety of protocols and techniques. Thus, the order in which the various layers and sub-layers are combined and the techniques of combining should not in any way limit the present invention unless such order or techniques is specifically claimed. Moreover, it is also contemplated that there may be greater or fewer layers and that each layer may include greater or fewer sub-layers.

In general, a lamination process is preferred to assemble the layers of the inserts. U.S. patent application Ser. No. 10/434,890, filed on May 9, 2003, hereby incorporated by reference, includes a discussion of one suitable technique for assembling the layers of inserts according to the present invention.

For assembly of the insert or system to a seat, the insert is preferably secured (e.g., sewn, adhered or otherwise attached) to a portion of the seat such as the cover (e.g., a perforated leather cover) or to a seat or backrest cushion (e.g., foam) of the seat. In one embodiment, the insert is first secured to a seat cover and then the seat cover is secured to the seat. For example, the insert may be joined to seat cover at the edges of the insert or it may be joined to the seat cover at locations other than along the edges of the insert.

In another embodiment, a seat cover may be configured to include a pocket for receiving the insert. Alternatively, it is contemplated that hook and loop fasteners may be utilized to attach the insert to portions (e.g., the cover, frame, seat cushion or backrest cushion) of the seat. Other techniques may be used to assemble the insert to the seat such as sewing, adhesives, snap-fit fasteners or locating pins. Furthermore, the insert may be attached to other components of the seat such as the seat frame.

By packaging the components of the system substantially entirely within a seat of the present invention, rather than external thereof, it is possible to realize various advantages, such as ease of manufacturing and assembly. For example, it is possible to assemble all of the functional components at a remote assembly site, and thereafter transport a seat to an automotive assembly line, where the seat is merely mounted to the body in white and connected to the vehicle electrical system. In contrast, other systems might rely upon a cooling device that is located external of a seat to provide cooled air to the seat. Though such systems are within the scope of certain embodiments of the present invention, they are less preferred.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method for cooling a seat of a transportation vehicle, comprising:
    placing a seat insert over a seat cushion and below a seating surface of a transportation vehicle seat;
    drawing ambient air to a location beneath the seating surface and into the insert and into a mixing region of the seat;
    mixing the drawn ambient air with a cooled fluid provided to the mixing region; and
    removing the resulting mixture from the mixing region.

2. The method of claim 1, wherein the transportation vehicle is an automotive vehicle, and the cooled fluid is air.

3. The method of claim 2, further comprising the step of cooling air by passage of the air through a heat exchanger and advancing the air to the mixing region.

4. The method of claim 3, wherein the heat exchanger includes a thermoelectric device and the air is advanced by a fan.

5. The method of claim 1, wherein the mixing region is disposed at least partially within an insert.

6. The method of claim 1, wherein the mixing region is disposed at least partially between an insert and the seating surface.

7. The method of claim 6, further comprising defining the mixing region in a space of the insert that has a plurality of flow holes through which the ambient air is drawn.

8. The method of claim 1, wherein the mixing region is enclosed within an insert.

9. The method of claim 8, further comprising defining the mixing region in a space of the insert that has a plurality of flow holes through which the ambient air is drawn.

10. The method of claim 9 wherein the insert is attached in fluid communication with the fan.

11. The method of claim 10, wherein the fan and the thermoelectric device are secured internally within the seat.

12. The method of claim 10, wherein the seat comprises a seat cover disposed over the insert for defining a seating surface.

13. The method of claim 12, wherein the seat cover is made of a material selected from a synthetic material, a natural material or a combination thereof, and the cover is selected from a woven material, an unwoven material, a perforated material, an impermeable material, or any combination thereof, and the seat further comprises at least one foam seat or backrest cushion.

14. The method of claim 13, wherein the cooled fluid is provided by blowing cooled air into the mixing region while preventing substantially all of the resulting mixture from passing through the seating surface.

15. The method of claim 14, further comprising the step of re-circulating at least a portion of the removed resulting mixture back into the mixing region.

16. The method of claim 14, further comprising maintaining the pressure in the mixing region below the ambient pressure so that substantially all of the resulting mixture does not pass through the seating surface.

17. The method of claim 14, wherein the cooled fluid is provided by blowing cooled air into the mixing region while preventing substantially all of the resulting mixture from passing through the seating surface.

18. The method of claim 13, further comprising maintaining the pressure in the mixing region below the ambient pressure so that substantially all of the resulting mixture does not pass through the seating surface.

19. The method of claim 13, further comprising the step of exhausting at least a portion of the resulting mixture to ambient air.

20. The method of claim 1, wherein the seating surface includes a cover made of a material selected from a synthetic material, a natural material or a combination thereof, and the cover is selected from a woven material, an unwoven material, a perforated material, an impermeable material, or any combination thereof, and the seat further comprises a foam seat cushion.

21. The method of claim 1, further comprising the step of exhausting at least a portion of the resulting mixture to ambient air.

22. The method of claim 21, further comprising the step of re-circulating at least a portion of the removed resulting mixture back into the mixing region.

23. The method of claim 1, further comprising the step of placing a seat insert over a seat cushion of the seat and below the seat surface.

24. The method of claim 23, wherein the air being drawn below the seat surface enters the seat insert.

25. The method of claim 24, wherein the seat insert is in fluid communication with a fan.

26. The method of claim 25, wherein the fan is located downstream from the mixing region.

27. The method of claim 26, wherein the mixing region is formed at least partially within the insert.

28. The method of claim 27, further comprising the step of providing the cooled fluid through the use of a thermoelectric device, the thermoelectric device including an active side and waste side and adapted to provide heating and cooling by passing electricity through the device, wherein the cooled fluid is provided by the active side of the thermoelectric device.

29. The method of claim 28, wherein the thermoelectric device comprises a peltier unit.

30. A method for cooling a seat of a transportation vehicle, comprising:
    placing a seat insert over a seat cushion and below a seating surface of a transportation vehicle seat;
    drawing ambient air to a location beneath the seating surface and into the insert and into a mixing region of the seat;
    mixing the drawn ambient air with a cooled fluid provided to the mixing region;
    removing the resulting mixture from the mixing region; and providing the cooled fluid through the use of a thermoelectric device, the thermoelectric device including an active side and waste side and adapted to provide heating and cooling by passing electricity through the device, wherein the cooled fluid is provided by the active side of the thermoelectric device.

31. A method for cooling a seat of a transportation vehicle, comprising:
   placing a seat insert over a seat cushion and below a seating surface of a transportation vehicle seat;
   drawing ambient air to a location beneath the seating surface and into the insert and into a mixing region of the seat with a fan;
   mixing the drawn ambient air with a cooled fluid provided to the mixing region;
   removing the resulting mixture from the mixing region by locating the fan down stream from the mixing region;
   providing the cooled fluid through the use of a thermoelectric device; and
   maintaining the pressure in the mixing region below the ambient pressure so that substantially all of the resulting mixture does not pass through the seating surface.

32. A method for cooling a seat of a transportation vehicle, comprising:
   placing a seat insert over a seat cushion and below a seating surface of a transportation vehicle seat;
   drawing ambient air to a location beneath the seating surface and into the insert and into a mixing region of the seat with a fan;
   mixing the drawn ambient air with a cooled fluid provided to the mixing region;
   removing the resulting mixture from the mixing region by locating the fan down stream from the mixing region; and
   providing the cooled fluid through the use of a thermoelectric device;
   wherein the cooled fluid is provided by blowing cooled air into the mixing region while preventing substantially all of the resulting mixture from passing through the seating surface.

* * * * *